US006690337B1

United States Patent
Mayer, III et al.

(10) Patent No.: US 6,690,337 B1
(45) Date of Patent: Feb. 10, 2004

(54) MULTI-PANEL VIDEO DISPLAY

(75) Inventors: Theodore Mayer, III, Shadow Hills, CA (US); Todd A. Chaney, Burbank, CA (US); Lawrence S. Paul, Encino, CA (US)

(73) Assignee: Panoram Technologies, Inc., Sun Valley, CA (US)

( * ) Notice: Subject to any disclaimer, the term of this patent is extended or adjusted under 35 U.S.C. 154(b) by 271 days.

(21) Appl. No.: 09/591,555

(22) Filed: Jun. 8, 2000

Related U.S. Application Data

(60) Provisional application No. 60/138,245, filed on Jun. 9, 1999.

(51) Int. Cl.⁷ .................................................. G09G 5/00
(52) U.S. Cl. ........................................... 345/1.1; 345/9
(58) Field of Search ........................ 345/1.1, 1.2, 1.3, 345/2.1, 2.2, 2.3, 3.1, 3.2, 5, 6, 9, 22, 26, 28, 87–88

(56) References Cited

U.S. PATENT DOCUMENTS

| | | | |
|---|---|---|---|
| 4,368,467 A | | 1/1983 | Unotoro et al. ............. 340/799 |
| 4,614,406 A | | 9/1986 | Motoi ......................... 350/334 |
| 4,800,376 A | | 1/1989 | Suga et al. .................. 340/721 |
| 4,962,420 A | | 10/1990 | Judenich ....................... 358/60 |
| 4,974,073 A | | 11/1990 | Inova .......................... 358/87 |
| 5,128,662 A | * | 7/1992 | Failla .......................... 340/711 |
| 5,136,390 A | | 8/1992 | Inova et al. ................. 358/231 |
| 5,275,565 A | | 1/1994 | Moncrief ...................... 434/29 |
| 5,467,102 A | | 11/1995 | Kuno et al. ..................... 345/1 |
| 5,523,769 A | * | 6/1996 | Lauer et al. .................... 345/1 |
| 5,612,741 A | | 3/1997 | Loban et al. ................. 348/383 |
| 5,625,386 A | | 4/1997 | Howard et al. ............... 345/201 |
| 5,668,569 A | | 9/1997 | Greene et al. ............... 345/103 |
| 5,734,446 A | | 3/1998 | Tokoro et al. ............... 348/745 |
| 5,790,371 A | | 8/1998 | Latocha et al. .............. 361/683 |
| 5,805,117 A | | 9/1998 | Mazurek et al. ................ 345/1 |
| 5,828,410 A | * | 10/1998 | Drapeau ..................... 348/383 |
| 5,900,848 A | | 5/1999 | Haneda et al. .................. 345/1 |
| 5,926,153 A | | 7/1999 | Ohishi et al. ................... 345/1 |
| 5,949,643 A | | 9/1999 | Batio .......................... 361/681 |
| 5,956,000 A | | 9/1999 | Kreitman et al. ............... 345/1 |
| 5,959,691 A | * | 9/1999 | Koh ........................... 348/581 |
| 5,969,696 A | | 10/1999 | Stoye ............................ 345/1 |
| 5,986,622 A | | 11/1999 | Ong ............................. 345/1 |
| 5,987,164 A | | 11/1999 | Szeliski et al. .............. 382/154 |
| 5,995,179 A | | 11/1999 | Tamura et al. ................ 349/58 |
| 6,020,868 A | | 2/2000 | Greene et al. ................. 345/88 |
| 6,032,918 A | * | 3/2000 | Cho ........................... 248/923 |
| 6,042,235 A | | 3/2000 | Machtig et al. ............... 353/28 |
| 6,043,797 A | | 3/2000 | Clifton et al. ................... 345/1 |
| 6,043,798 A | | 3/2000 | Yamamoto et al. ............. 345/1 |
| 6,043,805 A | | 3/2000 | Hsich ......................... 345/158 |
| 6,049,880 A | | 4/2000 | Song .......................... 713/300 |
| 6,115,022 A | | 9/2000 | Mayer, III et al. ........... 345/112 |
| 6,222,507 B1 | * | 4/2001 | Gouko ........................... 345/1 |

OTHER PUBLICATIONS

International Search Report; Oct. 10, 2000; 3 pages; International Application No. PCT/US00/40177.

International Preliminary Examination Report; Sep. 30, 2001; 4 pages; International Application No. PCT/US00/40177.

Written Opinion; Jun. 27, 2001, 4 pages; International Application No. PCT/US00/40177.

* cited by examiner

Primary Examiner—Vijay Shankar
Assistant Examiner—Mansour M. Said
(74) Attorney, Agent, or Firm—Christie, Parker & Hale, LLP

(57) ABSTRACT

A multi-panel video display system includes multiple display panels. The display panels are enclosed in a single chassis. The gaps or mullions between the display panels are minimized as to provide a composite display without distraction. The display panels are at an angle with one another as to make the display panels equidistant from the eye point of the user. The multiple display panels may be tilted forward such that display surfaces of the display panels may be at an angle with respect to the plane normal to ground.

31 Claims, 11 Drawing Sheets

MULTI-PANEL VIDEO DISPLAY

CROSS REFERENCE TO RELATED APPLICATIONS

The present application claims the benefit of U.S. provisional patent application No. 60/138,245 entitled "Multi-Panel Video Display," filed Jun. 9, 1999, the contents of which are hereby incorporated by reference.

BACKGROUND OF THE INVENTION

Computer users often desire to view video or graphic images that exceed the viewable area of a single monitor. For example, designers of large systems often use computer aided design (CAD) tools to generate designs. Many times, these designs are too detailed or too large to fully display on a single monitor with the desired high enough resolution. In addition, users often display multiple computer windows simultaneously. The multiple windows typically overlay and block one another since the viewable area of a monitor is generally not large enough to accommodate more than a few computer windows at the same time.

A typical home computer user may become frustrated by the crowding of the desktop screen by multiple computer windows. A professional computer user, e.g., a graphic artist or a CAD designer, in addition, may suffer from inefficiency or low productivity associated with being able to view only a portion of a large image or having to stack and re-stack multiple computer windows.

A larger viewable area, i.e., larger screen real estate, and higher resolution, i.e., more pixels, is typically very useful for laying out and viewing a larger portion of video or graphic images at the same time. Therefore, it is often desirable to display video or graphic images on a viewable area that is bigger than what is typically available on a single monitor. Arrayed display systems have been used to create a viewable area that is taller or wider than what is normally available on a single monitor. A typical arrayed display system includes three or more video display devices that are adjacent to one another.

The arrayed display systems typically include projector-based display systems. These systems typically include three or more video projectors that are arrayed in an overlapping adjacent format with each projector being fed by one channel of a visual computer or other video source. The result generally includes a composite image that combines the additive size, the additive brightness and the additive resolution of the multiple channel source and the multiple projectors. The projector-based display systems may use, for example, the processed described in U.S. Pat. No. 5,136,390 entitled "Adjustable Multiple Image Display Smoothing Method and Apparatus" to create a single seamless image.

The use of projector-based display systems may provide a larger viewable area and higher resolution than a single monitor or a display device. However, a projector-based display system is typically not suited for widespread use by individuals since it is costly and generally requires a great deal of technical support and regular maintenance. In addition, the current system is typically bulky and thus occupies a large space.

Multiple conventional computer monitors may be placed adjacently side by side to provide a type of arrayed display system. However, due to the packaging of most standard CRTs and other monitors, such a configuration typically results in wider than acceptable gap, also referred to as a mullion, between the displays. This prevents the displays from having an integrated look as illustrated in FIGS. 1A, 1B and 2.

FIG. 1A illustrates three conventional monitors 100, 102 and 104 placed side-by-side in an array. FIG. 1B is a top view of the three arrayed monitors 100, 102 and 104 of FIG. 1A. The monitors 100, 102 and 104 have viewable areas 106, 108 and 110, respectively. The viewable areas are smaller than the front surface of the monitors because of the respective housings. A relatively wide gap or mullion, e.g., gap 112 between the viewable areas 108 and 110 of the adjacent monitors 102 and 104, exists between adjacent viewable areas.

FIG. 2 illustrates a distracting effect of the mullions between the viewable areas when the three monitors 100, 102 and 104 are used to display a single composite image. The composite image displays the enlarged text "TEST" across all three of the monitors. As shown in the figure, the first T is displayed on monitors 100 and 102 while the second T is displayed on monitors 102 and 104. The relatively large mullions may distract viewers from viewing the text as a single integrated image.

Therefore, there is a need for an arrayed display system that is capable of providing reduced separation between portions of a composite image in adjacent displays as to reduce viewer distraction. The arrayed display system preferably takes less space and requires less technical support and less frequent maintenance. The arrayed display system preferably is also affordable to a wider range of users and designed to address ergonomic considerations for providing viewer comfort.

SUMMARY OF THE INVENTION

Accordingly, in one embodiment of the present invention, a multi-panel video display system includes a plurality of display panels and a housing to contain them. The plurality of display panels are fixedly mounted in the housing, and they are adjacent to one another such that a width of a mullion between adjacent display panels is minimized. The display panels are also at an angle with respect to one another such that the display panels are substantially equidistant from an eye point of a user.

Another embodiment of the present invention is a method of displaying a high resolution image using a plurality of display panels. The plurality of display panels are mounted in a single housing closely to one another as to minimize a mullion between viewable areas of adjacent ones of the plurality of display panels. The display panels are at an angle with one another so that the display panels are substantially equidistant from an eye point of a user.

Yet another embodiment of the present invention is a method of fabricating a three-panel video display system for displaying a high resolution image. A range of angles between a center panel and each of left and right side panels is calculated. The range of angles are selected so that the center panel, the left side panel, and the right side panel are substantially equidistant from an eye point of a user when the distance between the center panel and the eye point of the user is between approximately 18 inches and approximately 24 inches. The center panel and the left and right side panels are mounted in a housing with an angle between the center panel and each of the left and right side panels within the range of angles.

Figure 1A:
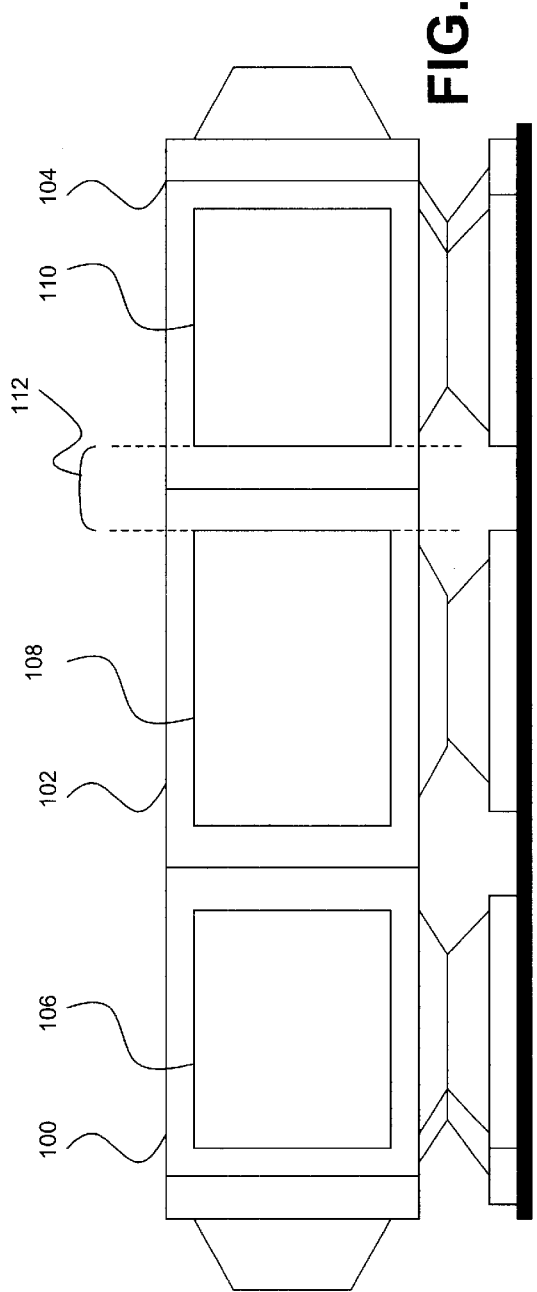
FIG. 1A is an illustration of three conventional monitors placed next to one another in an exemplary prior art configuration.
Figure 1B:
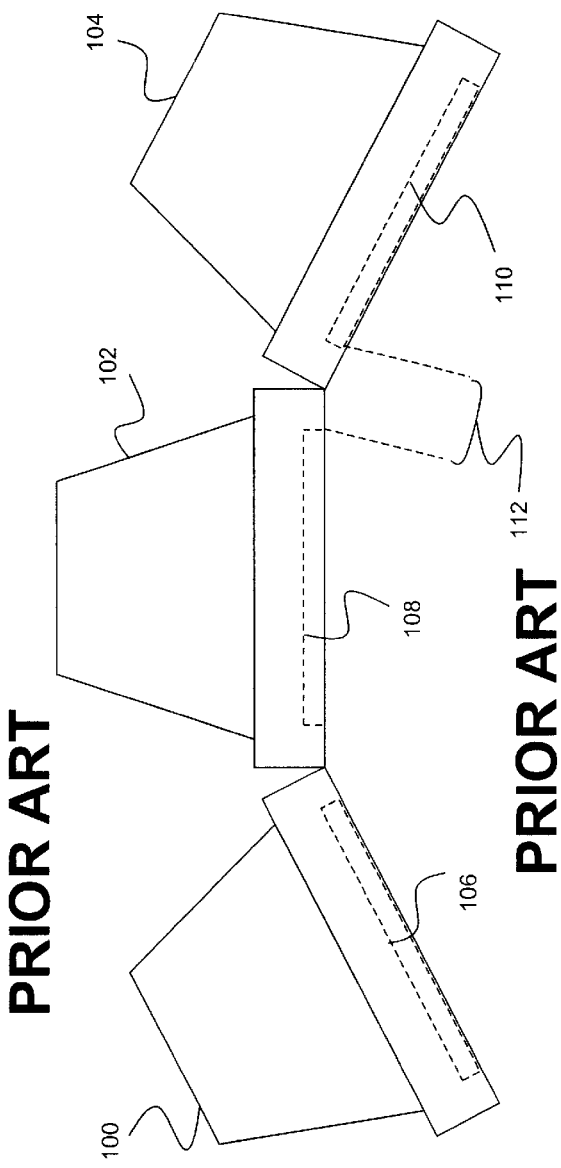
FIG. 1B is a top view of the three conventional monitors of FIG. 1A.
Figure 2:
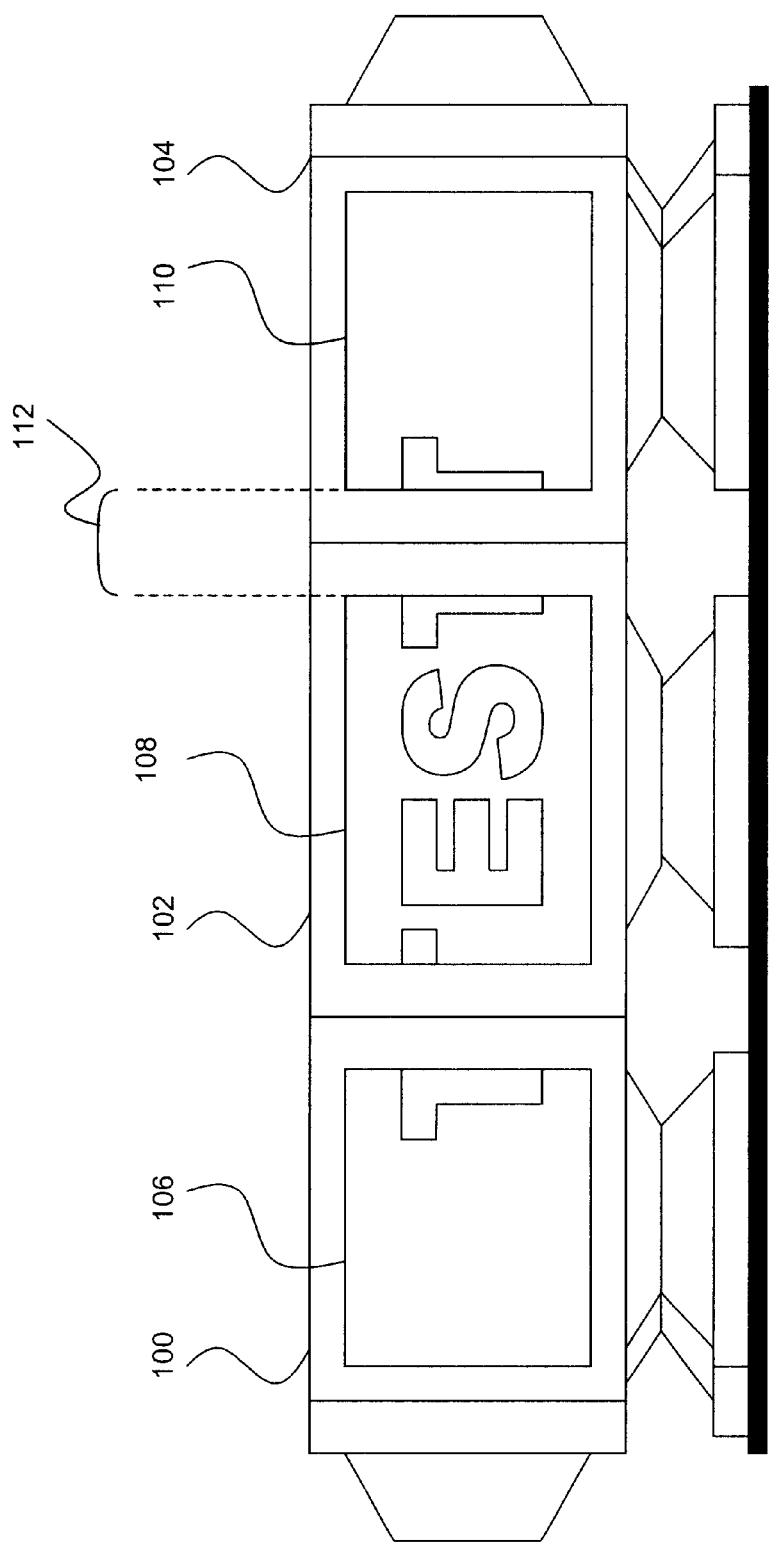
FIG. 2 is an illustration of a display of a composite image over three adjacent conventional monitors arranged in a prior art configuration.

Common reference numerals may be used to represent like components.

DETAILED DESCRIPTION

Figure 3A:
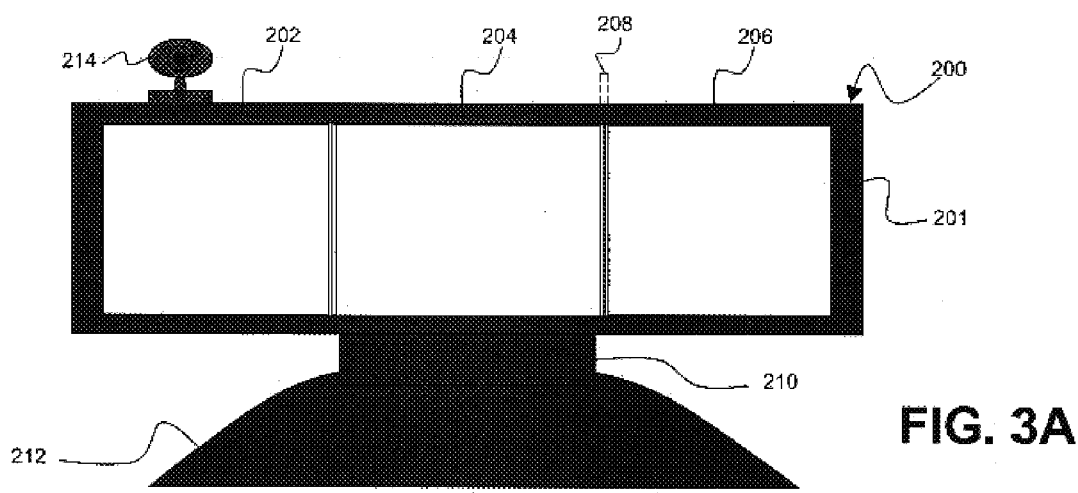
FIG. 3A is an illustration of a multi-panel video display according to an embodiment of the present invention, having three display panels mounted in a single chassis at an angle with respect to one another.

FIG. 3A is an illustration of one embodiment of a multi-panel video display 200 that includes three display panels 202, 204 and 206 that are packaged into a single chassis (housing or molding) 201, allowing the display panels to be placed much closer to one another with the separation between two adjacent images being less than approximately 3% of the composite image. In other embodiments, the separation between two adjacent images may be approximately 1% or less of the composite image. Studies have indicated that approximately 7% between two adjacent images may be the allowable separation beyond which the users are typically distracted from considering the images as a single composite image.

Use of a single chassis in one embodiment to mount the three display panels results in a robust system. Since the displays panels are mounted in a single chassis, for example, re-alignment of the displays is typically not necessary, thus reducing the need for technical support when compared to the case of using projector-based arrayed displays. In other embodiments, the number of display panels may be more or less than three.

A mullion 208 is located between two adjacent display panels 204 and 206. In one embodiment, the width of the mullion 208 is less than approximately 3% of the width of the composite image. For example, in the described embodiment, the display panels 204 and 206 are actually touching each other at the adjacent edge. However, due to current state of the technology used to fabricate the display panels, there may be no active pixels at their left and right edges. For example, the display panels 204 and 206 may be liquid crystal display (LCD) panels that do not have active pixels at left and right edges. Thus, in the described embodiment, even though glass of one LCD panel may be touching glass of the adjacent LCD panel, but not completely without a seam between the images. In other embodiments, the mullion 208 may actually disappear, e.g., with the availability of active pixels at the left and right edges, resulting in a truly seamless composite image.

The multi-panel video display 200 may be tilted forward, i.e., towards the user, such that the plane of a display surface of the display panel 204 is at an angle with respect to a plane normal to the ground. For example, in one embodiment of the present invention, this angle is approximately 5.5 degrees. In another embodiment, this angle is approximately three degrees. In other embodiments, the angle may be greater than approximately three degrees and less than approximately 5.5 degrees. In still other embodiments, the angle may be less than approximately three degrees or greater than approximately 5.5 degrees.

The multi-panel video display 200 may also be tilted backward, i.e., away from the user. For example, in one embodiment of the present invention, the multi-panel video display 200 may be tilted backward at an angle of approximately 30 degrees. In other embodiments, the multi-panel video display 200 may be tilted at an angle less than or greater than 30 degrees.

The multi-panel video display may also be coupled to a control unit (not shown) for providing inputs and power to the display panels, and for controlling the displays. The control unit may be mounted on the chassis 201 or on the base 212. The control unit may also be mounted on the support 210. In addition, the control unit may be a separate unit which is not mounted on the chassis, the support or the base.

In one embodiment, the multi-panel video display includes an integrated control unit, which is used to control display characteristics of all three of the display panels. In other embodiments, a separate control unit may be used to control display for each display panel.

The multi-panel video display 200 may include a control software for display configuration and maintenance. The control software may be commanded to perform control functions from the control unit or any other external device such as an external computer. The control software may be controlled by using an input device such as a keyboard and/or mouse.

In one embodiment, the multi-panel video display may include a port (not shown), such as a universal serial bus (USB) port, an RS-232 port, or any other conventional or non-conventional serial or control port, for communication with an external device such as a computer. The port may be used to perform control functions. The port input and the control software preferably allows for external control of characteristics including but not limited to: screen input selection, automatic input calibration and three screen interactive color adjustments. A full setup configuration may be stored and be easily accessible, by, e.g., clicking a mouse button.

The display panels may include an liquid crystal display (LCD) panels or they may include any other commonly used display panels such as plasma display panels. The display panels may also include digital display panels such as digital video interface (DVI) panels. The chassis 201 may be made of plastic, metal or any other suitable material. In this embodiment, the chassis 201 is fixedly coupled to a support 210, which in turn is fixedly coupled to a base 212. In other embodiments, the chassis 201 may be hingedly coupled to a support, and the support may include a hinge for folding and unfolding.

The multi-panel video display in one embodiment of the present invention is capable of receiving inputs including but not limited to: a main and auxiliary RGB signals for each of the three display panels, composite video signals and/or S-video (Y/C). These inputs allow for use of other devices in addition to a main multi-channel visual computer. Other devices that may provide inputs to the multi-panel video display may include laptops, VCR, DVD, video conferencing equipment, cable television set top box, as well as closed circuit television and satellite feeds. For example, the user may be able to select the input feeds using a computer through the USB port. The multi-panel video display 200 may also include audio inputs and be coupled to speakers for audiovisual communications.

In one embodiment, a camera 214 may be placed on top of the multi-panel video display 200. The camera 214 may be placed at any location across the top of the multi-panel video display 200. A flat channel may be available at the top of the chassis 201 so that the camera 214 may be positioned at any location along the top of the chassis. The camera 214 may be a video camera, which, for example, is used for video conferencing. The base 212 may include a power supply (not shown) for utility devices such as video conference cameras. The power supply may be a 12V power supply.

Figure 3B:
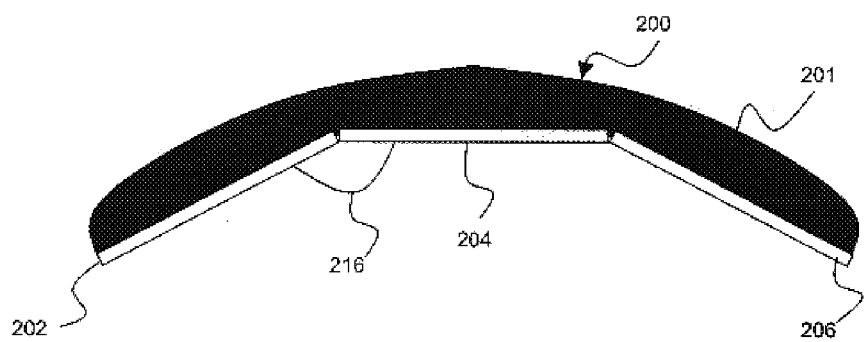
FIG. 3B is a top view of a multi-panel video display of FIG. 3A.

FIG. 3B is a top view of the multi-panel video display 200, which includes three display panels 202, 204 and 206 encased in a single chassis 201. The angle 216 between the display panel 202 and the display panel 204 is fixed, and is decided based on such factors as the size of the display panels and the typical distance of the user from the multi-panel video display. The angle between the display panel 204 and the display panel 206 is also fixed and is similar to the angle 216. In other embodiments, chassis 201 may be divided into three individual housings and/or the display panels 202, 204 and 206 are hingedly coupled to one another such that the angle between adjacent display panels are variable.

Figure 4:
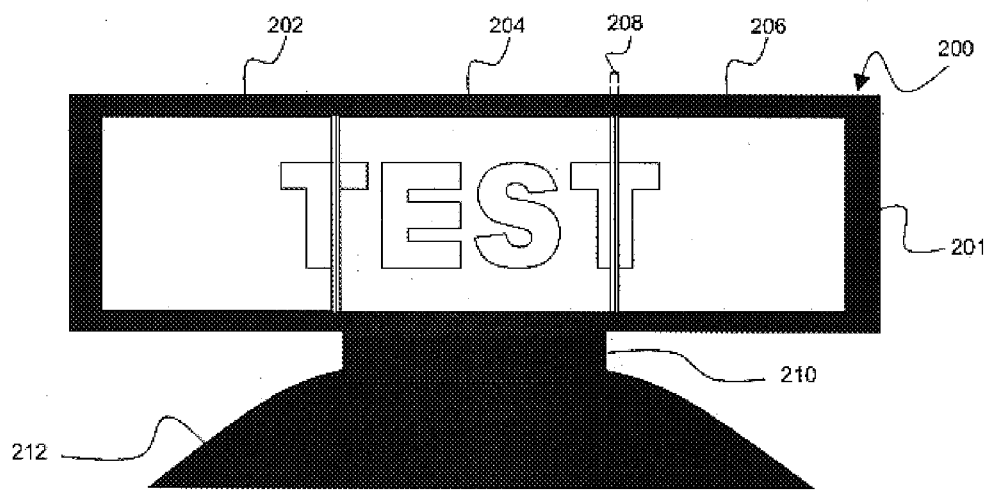
FIG. 4 is an illustration of a display of a composite image over a multi-panel video display according to an embodiment of the present invention.

FIG. 4 is an illustration of one embodiment of the present invention that shows the multi-panel video display 200 displaying a composite image "TEST". The gap between the adjacent display panels are reduced such that the mullion 208 is less than approximately 3% of the composite image. In other embodiments, the mullion 208 may be approximately 1% or less of the composite image. A portion of the first "T" appears on the display panel 202 while another portion of the first "T" appears on the display panel 204. Due to the separation of less than approximately 3% (of the composite image) between the viewable areas of the two display panels, the spacing between the two portions of the first "T" is relatively non-distracting. This also applies to two portions of the second "T", which appears on viewable areas of the display panels 204 and 206, respectively.

Figure 5:
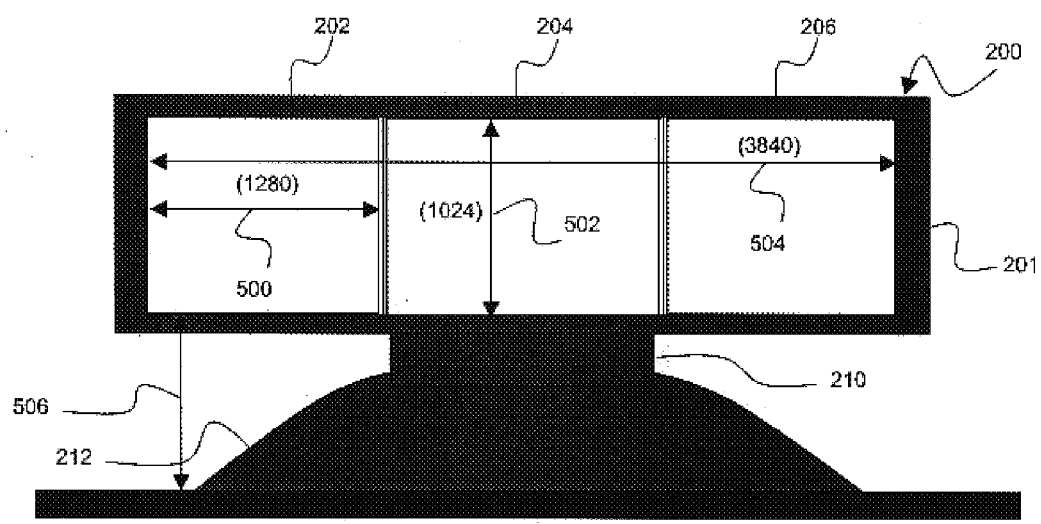
FIG. 5 is a front view of a multi-panel video display according to an embodiment of the present invention.

FIG. 5 is an illustration that shows display size of the composite image on a multi-panel video display 200. Each of the three display panels 202, 204 and 206 has a horizontal active pixel count 500 of 1280 and a vertical active pixel count 502 of 1024. Thus, each of the three display panels in this embodiment is capable of displaying 1280×1024 (1.3 million) pixels. Therefore, a total horizontal active pixel count 504 across the three display panels is 3840, and the multi-panel video display 200 is capable of displaying 3840×1024 (3.9 million) pixels.

In one embodiment of the present invention, the height 506 from a supporting surface to lower edges of the display panels is fixed. Thus, the height 506 of the display panels may be adjusted by adjusting the height of the supporting surface. In other embodiments, the height 506 may be variable so that the height of display panels may be adjusted, e.g., depending on the eye level of the user. The eye level of the user is an eye height of the user at the time he or she is viewing images on the multi-panel video display.

Figures 6A, 6B:
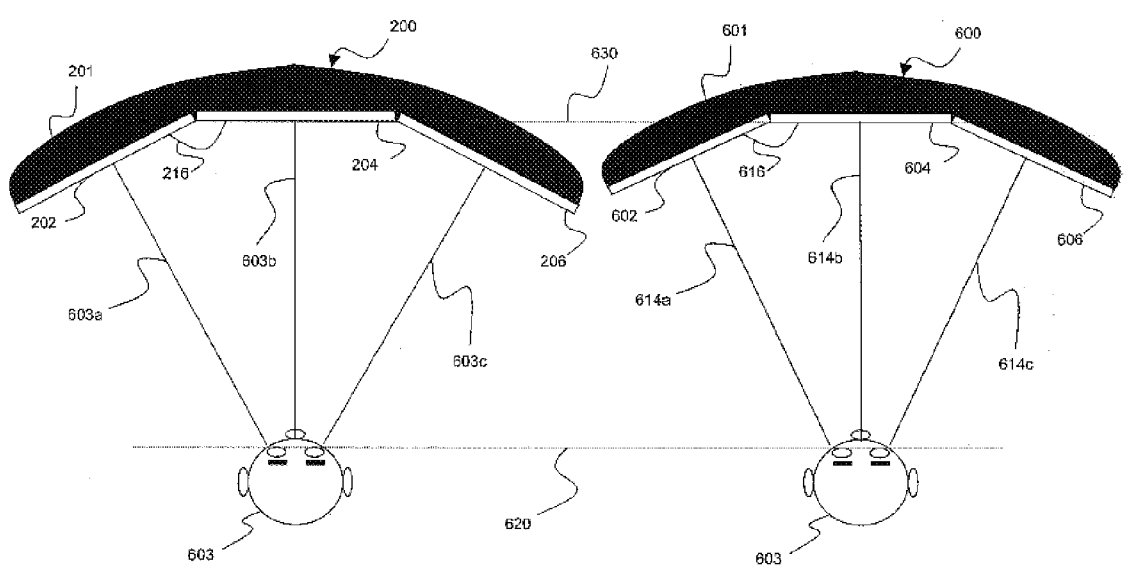
FIG. 6A is a top view of a multi-panel video display according to the present invention, in which the three display panels are mounted in a single chassis to be substantially equidistant from the user.
FIG. 6B is a top view of a multi-panel video display similar to the multi-panel video display of FIG. 6A, except that the angles between the panels are narrower.

FIG. 6A is an illustration of a spatial relationship between a multi-panel video display 200 and a user 601. A line 620 is indicative of an eye position of the user 601. A line 630 is indicative of a position of a display surface of a center display panel. An angle 216 between adjacent display panels is selected in accordance with the design distance between an eye point of the user 601 and the multi-panel video display 200. The eye point is defined to be at the location of the user's eyes. A chassis 201 of the multi-panel video display 200 is designed so that the eye point of the user 601 is substantially equidistant from each of three display panels 202, 204 and 206. In other words, the distances 603a, 603b and 603c between the eye point of the user 601 and the display panels 202, 204 and 206, respectively, are approximately equal to one another.

The distances 603a, 603b, 603c and the angles between the display panels are preferably selected based on ergonomic considerations. For example, in one embodiment of the present invention, the angle 216 preferably is approximately 140 degrees when each of the distances 603a, 603b, 603c is between approximately 18 and approximately 24 inches and each of the display panels 202, 204, 206 is an 18.1" display panel. In other embodiments, the distances or the angles may be different.

FIG. 6B is an illustration of the spatial relationship between a multi-panel video display 600 and a user 601. An angle 616 between adjacent display panels is selected in accordance with the design distance between an eye point of the user 601 and the multi-panel video display 600. A chassis 601 of the multi-panel video display 600 is designed so that the eye point of the user 601 is substantially equidistant from each of three display panels 602, 604 and 606. In other words, the distances 614a, 614b and 614c between the eye point of the user 601 and the display panels 602, 604 and 606, respectively, are approximately equal to one another.

The display panels 602, 604 and 606 in FIG. 6B are smaller than the display panels 202, 204 and 206 of FIG. 6A. For example, the display panels 202, 204, 206 may be 18.1" in size while the display panels 602, 604, 606 may be 15.0" in size. When FIG. 6A is compared with FIG. 6B, it can be seen that there is a relationship between the size of the display panels and the angle between adjacent display panels. The relationship is that the size of the display panels of the multi-panel video display is typically inversely proportional to the angle between adjacent display panels. For example, the angle 216 between two adjacent display panels may be approximately 140 degrees while the angle 616 between two adjacent display panels may be approximately 155 degrees when the distances 603a, 603b, 603c are approximately equal to the distances 614a, 614b, 614c.

Figure 7:
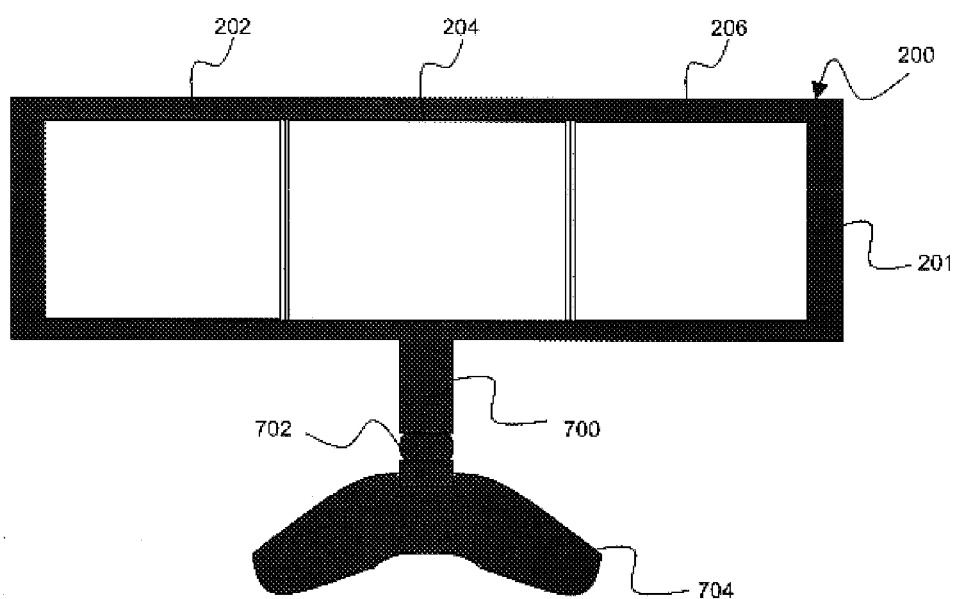
FIG. 7 is a front view of a multi-panel video display according to an alternate embodiment of the present invention, which is mounted on a hinged support.

FIG. 7 is a multi-panel video display 200 in another embodiment of the present invention. The multi-panel video display 200 includes display panels 202, 204 and 206 enclosed in a single chassis 201. The chassis 201 preferably is hingedly coupled to a support 700 via a hinge (not shown) at the backside of the chassis 201. The hinge allows the chassis 201 to tilt up or down with respect to the axis of the support 700.

The support 700 preferably includes a hinge 702. The hinge 702 preferably allows the support 700 to fold and unfold. By folding and unfolding the hinge 702, the multi-panel video display 200 may be vertically adjusted. In others, the multi-panel video display 200 may be moved up or down with respect to a base 704, which is coupled at the bottom of the support 700. In one embodiment, the support 700 may be rotatably coupled to the base 704 so that the support 700 is capable of rotating about an axis normal to the ground.

Figure 8:
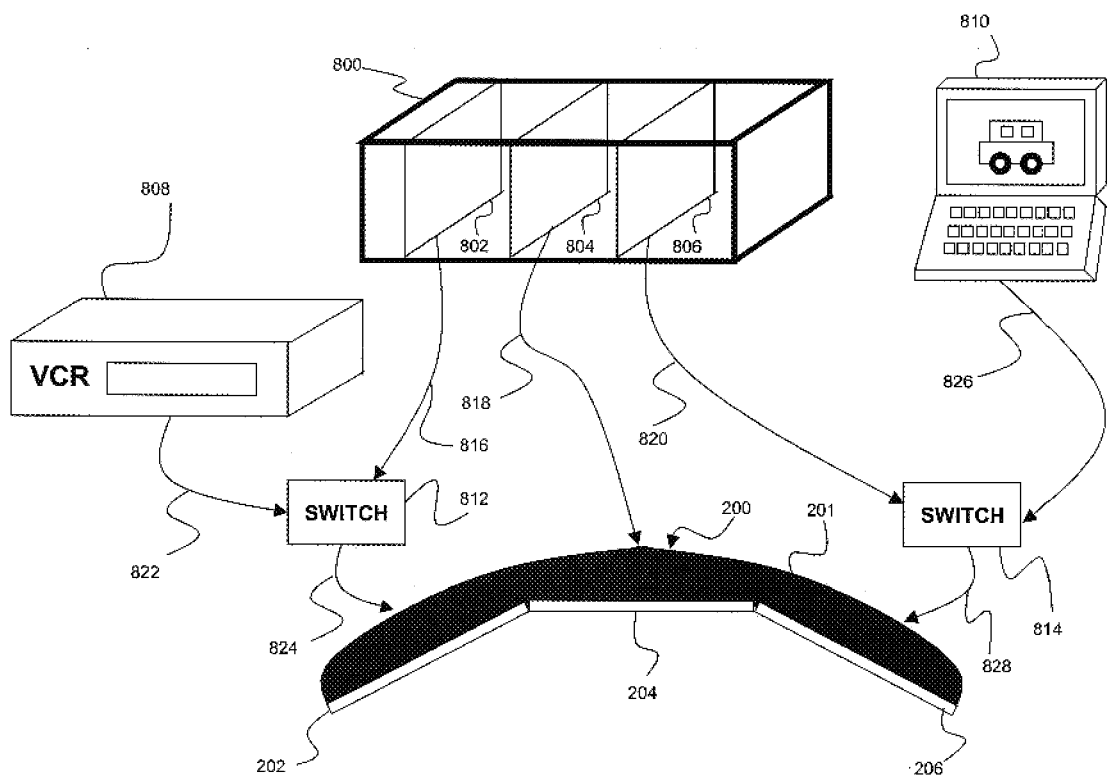
FIG. 8 is a block diagram that illustrates operation of the three displays to display images from a multi-channel visual computer, a laptop and a video cassette recorder (VCR)

FIG. 8 is an illustration that shows interfaces, in one embodiment of the present invention, between a multi-panel video display 200 and devices that provide video and graphics to the multi-panel video display 200. The multi-panel video display 200 preferably includes three display panels 202, 204 and 206. A multi-channel visual computer 800 preferably includes three graphic interface cards 802, 804 and 806. The graphic interface cards 802, 804 and 806 preferably provides images 816, 818 and 820 to corresponding display panels 202, 204 and 206, respectively. The multi-channel visual computer may be based on one or more of Unix, Mac-OS, Windows/NT and Linux operating systems or any other conventional or non-conventional operating system.

The multi-channel visual computer 800 may provide graphics and/or video signals that represent the images 816, 818 and 820 to corresponding input for each of the three display panels 202, 204 and 206 including but not limited to: main and auxiliary RGB inputs, composite video inputs and S-video (Y/C) inputs. In other embodiments, two or three separate computers may be used in place of the multi-channel visual computer 800 to provide graphics and/or video signals to the multi-panel video display 200. The images 816, 818 and 820 may be three unrelated images or each of the images may be a portion of a composite image. The graphic images 816, 818 and 820 may also be substantially identical to one another.

An additional image may be provided by a laptop 810 or any other computer or an electronic device capable of providing an image. The laptop 810 preferably provides an image 826 to the multi-panel video display 200. For example, the image 826 may include a picture of an automobile.

Since the multi-panel video display 200 in this embodiment is typically used to display three images, one on each display panel, when the laptop 810 provides the fourth image 826 in addition to the graphic images 816, 818 and 820 from the multi-channel visual computer 800, a switch 814 preferably is used to switch between one of the images from the multi-channel visual computer 800 and the image 826. For example, the images 820 and 826 preferably are coupled to the switch 814. The switch 814 preferably multiplexes them to provide an image 828 to the display panel 206 of the multi-panel video display 200. The image 828 may be the image 820 or the image 826 based on the selection by the switch. The switch 814 may be manually controlled, e.g., through manipulation of a mechanical switch by the user. The switch 814 may also be controlled automatically, e.g., by a software running in the control unit (not shown).

A video cassette recorder (VCR) 808 in one embodiment may provide a graphic image 822 to a switch 812. The image 816 from the multi-channel visual computer preferably is also coupled to the switch 812. The switch 812 preferably operates similarly to the switch 814 in that it selects between the image inputs to provide an image 824 to the display panel 202 of the multi-panel video display 200. Similarly, the image 818 may also be coupled to a switch in other embodiments.

Figure 9A:
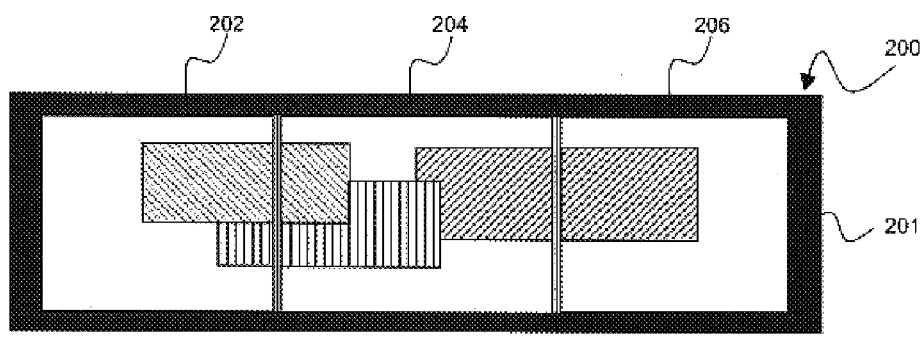
FIG. 9A is a front view of a multi-panel video display according to the present invention, in which a composite image is displayed across three display panels.

FIG. 9A is a front view of the multi-panel video display 200 in one embodiment of the present invention. The multi-panel video display 200 displays a composite image across the three display panels 202, 204 and 206. In one embodiment, all three images that make up the composite image may be provided by the multi-channel visual computer 800 in FIG. 8. For example, the three images may be provided by the three graphic interface cards, 802, 804 and 806, respectively. In other embodiments, each of the three images may be provided by a different computer.

Figure 9B:
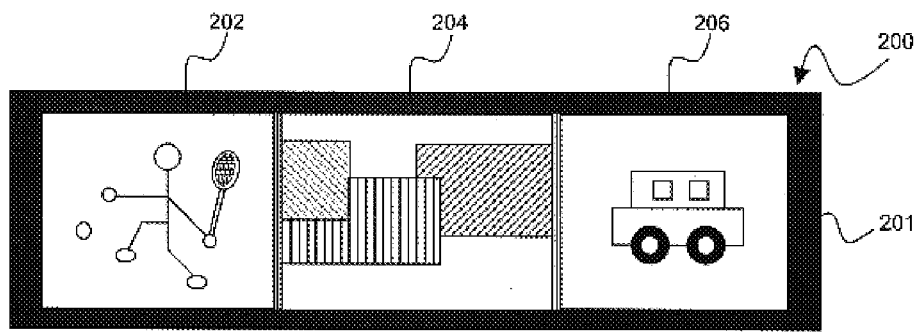
FIG. 9B is a front view of a multi-panel video display according to the present invention, in which separate images are displayed on each of three display panels.

FIG. 9B is a front view of the multi-panel display 200 in one embodiment of the present invention. The display panel 204 displays a portion of the composite image similar to the display panel 204 shown in FIG. 9A. The portion of the composite image may be provided by the graphic interface card 804 shown in FIG. 8. The display panel 202, however, displays an image that is independent of the composite image. For example, the image in the display panel 202 may be that of a person playing tennis. The image in the display panel 202, e.g., may be provided by the VCR 808 through the switch 812 shown in FIG. 8.

The display panel 206 also displays an image that is independent of the composite image. For example, the image in the display panel 206 may be that of an automobile. The image in the display panel 206, e.g., may be provided by the laptop 810 through the switch 814 shown in FIG. 8. In other embodiments, the display panel 204 may also display an image, which is not a part of a composite image.

Figure 10:
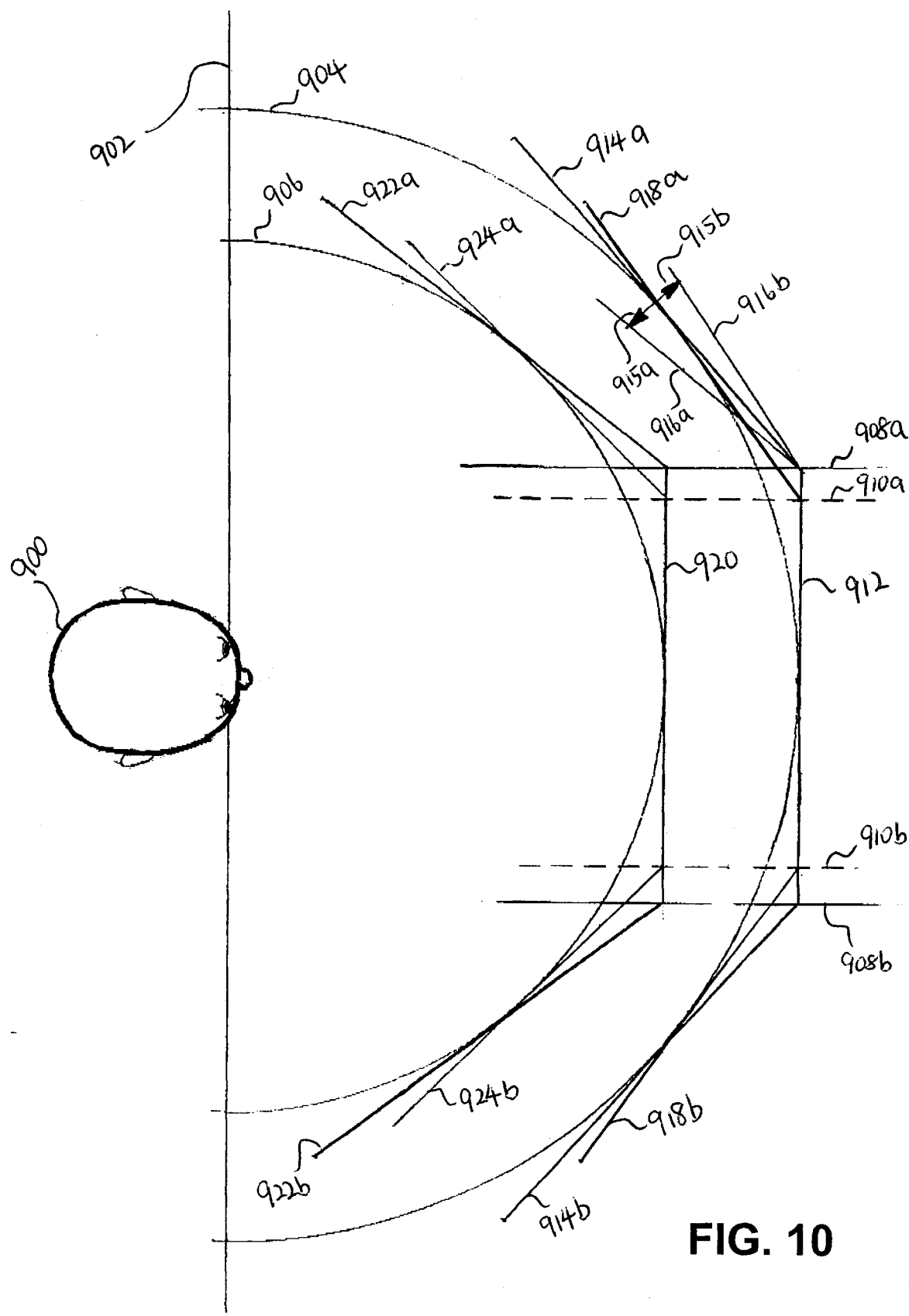
FIG. 10 is a diagram that illustrates a spatial relationship between a user and surfaces of multi-panel video displays with 18.1" display panels and 15.0" display panels at two distances (18" and 24")

FIG. 10 is a diagram that illustrates a spatial relationship between a user (viewer) 900 and display surfaces of multi-panel video displays. In FIG. 10, a multi-panel video display with three 18.1" display panels and a multi-panel video display with three 15.0" display panels are represented both at approximately 18" and approximately 24" away from an eye point of the user 900. The spatial relationships between the user 900 and multi-panel video displays have been designed to provide user comfort in accordance with ergonomic principles. The ergonomic considerations are based on disclosures in *Ergonomic Design for People at Work Volume I*, Eastman Kodak Company, Wiley & Sons, Inc., 1983 (ISBN 0471-28924-8) and *The Measure of Man and Woman: Human Factors in Design*, Henry Dreyfuss Associates, Whitney Library of Design (New York), 1993 (ISBN 0-8230-3031-8), which are hereby fully incorporated by reference.

In the described embodiment, a line 902 passes through the eye point of the user 900. Semi-circles 904 and 906, respectively, are approximately 24 inches and approximately 18 inches away from the eye point of the user 900. According to ergonomic principles, a display surface located at between approximately 18" and approximately 24" from the eye point of the user (viewer) 900 typically provides viewing comfort of the user 900.

Lines 908a and 908b, respectively, represent left and right edges of a 18.1" center panel with a display surface represented by line 912. The line 912 is tangent to the semi-circle 904 at about the center of the display surface of the 18.1"

center panel. Lines 914a and 914b, respectively, represent display surfaces of 18.1" side panels that are coupled to the center panel at the lines 908a and 908b. The lines 914a and 914b are tangent to the semi-circle 904 at about the center of the display surfaces, respectively, of the 18.1" side panels.

In the described embodiment, the display surfaces of the 18.1" center panel and the two 18.1" side panels preferably are substantially equidistant from the eye point of the user 900. However, in practice, the distances of the side panel display surfaces from the eye point may be slightly more or slightly less than the distance between the center panel display surface and the eye point. For example, arrows 915a and 915b indicate a tolerance of ±1 inch for the left 18.1" side panel. In other words, the display surface of the left 18.1" side panel may be represented by a line 916a, which is one inch closer than the line 914a to the eye point of the user 900, or by a line 916b, which is one inch further than the line 914a from the eye point of the user 900.

In the described embodiment, the line 912 also represents a display surface of a 15.0" center panel whose left and right edges are represented by lines 910a and 910b, respectively. The line 912 is tangent to the semi-circle 904 (with a radius of 24") at about the center of the display surface of the 15.0" center panel. Lines 918a and 918b, respectively, represent display surfaces of 15.0" side panels that are coupled to the 15.0" center panel at the lines 910a and 910b. The lines 918a and 918b are tangent to the semi-circle 904 at about the center of the display surfaces, respectively, of the 15.0" side panels.

It can be seen from FIG. 10 that an angle between a center panel and a side panel is greater for the 15.0" display panels than for the 18.1" display panels. For example, the angle between the line 912 (representing the display surface of the 15.0" center panel) and the line 918a (representing the display surface of the left 15.0" side panel) is greater than the angle between the line 912 (representing the display surface of the 18.1" center panel) and the line 914a (representing the display surface of the left 18.1" side panel). For example, in one embodiment, the angle between the line 912 and the line 918a is 155 degrees while the angle between the line 912 and the line 914a is 140 degrees.

FIG. 10 also illustrates multi-panel displays with three 18.1" display panels and three 15.0" display panels, respectively, at approximately 18" from the eye point of the user 900. In the described embodiment, a line 920 represents both a display surface of a 18.1" center panel and a display surface of the 15.0" center panel. The 18.1" center panel has left and right edges indicated by the lines 908a and 908b, respectively. The 15.0" center panel has left and right edges indicated by the lines 910a and 910b, respectively. The line 920 is tangent to the semi-circle 906 at about the center of the display surfaces of the 18.1" center panel and the 15.0" center panel.

Lines 922a and 922b, respectively, represent display surfaces of left and right 18.1" side panels. The left and right 18.1" side panels are coupled to the 18.1" center panel at the lines 908a and 908b, respectively. The lines 922a and 922b are tangent to the semi-circle 906, respectively, at about the center points of the left 18.1" side panel and the right 18.1" side panel.

Lines 924a and 924b, respectively, represent display surfaces of left and right 15.0" side panels. The left and right 15.0" side panels are coupled to the 15.0" center panel at the lines 910a and 910b, respectively. The lines 924a and 924b are tangent to the semi-circle 906, respectively, at about the center points of the left 15.0" side panel and the right 15.0" side panel.

Figure 11:
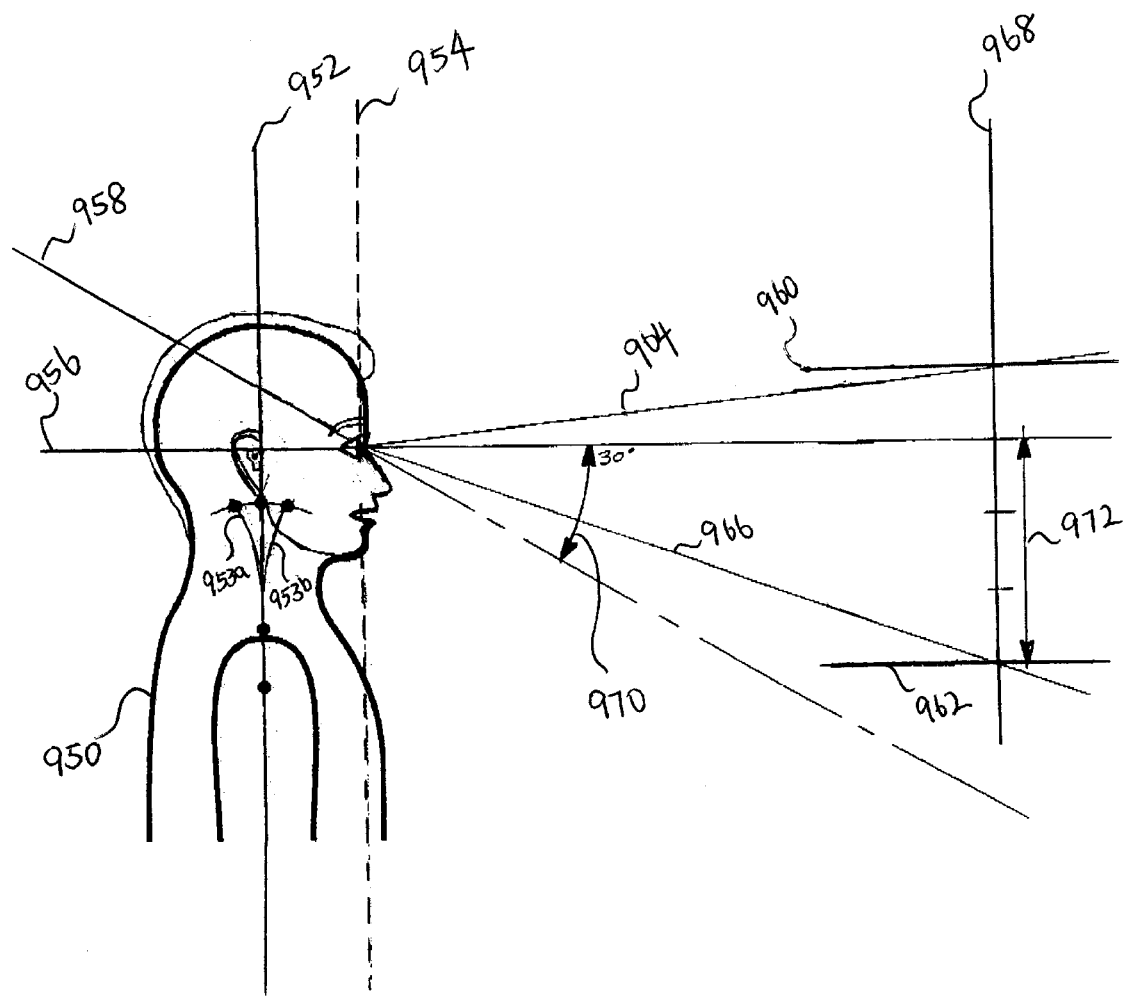
FIG. 11 is a diagram that illustrates an example of ergonomic principles used during the design of one embodiment of multi-panel video display of the present invention.

FIG. 11 a diagram that illustrates an example of ergonomic principles used during the design of one embodiment of multi-panel video display of the present invention. A user 950 has an eye line (sight line) represented by a line 956. A line 952 indicates an alignment between the head and spine of the user when the head is not tilted either forward or backward with respect to the spine. A line 954 indicates horizontal location of the user's eye point. Arcs 953a and 953b, respectively, indicate an alignment between the head and the spine of the user when the head is tilted −3 degrees and +3 degrees with respect to the spine. For user comfort, the user (viewer) preferably is not required to tilt the head by more than 3 degrees either forward or backward when viewing a display.

A line 958 forms a 30 degree angle 970 with respect to the line 956. A vertical viewing range of an eye in a downward direction, without tilting the head, typically is 30 degrees. A height of the multi-panel video display is designed so that the line 956 (which represents the eye line (eye level) of the user) is at ¾th of the distance between a bottom edge 962 and a top edge 960 of a center display panel. The ¾th of the distance is represented by a double-headed arrow 972. A line 966 and a line 964, respectively, intersects the line 962 (the bottom edge of the display panel) and the line 960 (the top edge of the display panel) at the plane of the display surface of the center display panel.

Table 1 gives a list of preferred ranges of an angle between the center panel and the side panels for providing user comfort in accordance with ergonomic principles in one embodiment of the present invention. In other embodiments, the distance from the eye point of the user to the center panel may be less than 18" or more than 24", in which case new ranges of angle between the center panel and the side panels may be derived. For example, for panel with larger sizes, e.g., for a 52" panel, the distance to center panel may be adjusted to exceed 24", and the range of angle may reflect the increased distance to the center panel.

TABLE 1

| Panel Size | Dimensions (W x H) | Eye Line from Bottom | Distance to Center Panel | Angle of Side Panels (DEG) |
|---|---|---|---|---|
| 12.1" | 9.68" x 7.26" | 5.45" | 18" | 136–162 |
|  |  |  | 24" | 145–169 |
| 14.0" | 11.2" x 8.4" | 6.3" | 18" | 135–155 |
|  |  |  | 24" | 144–164 |
| 15.0" | 12" x 9" | 6.75" | 18" | 133–153 |
| 15.1" | 12.08" x 9.06" | 6.8" | 24" | 142–162 |
| 18.0" | 14.4" x 10.8" | 8.1" | 18" | 128–144 |
| 18.1" | 14.48" x 10.86" | 8.14" | 24" | 138–154 |
| 20.0" | 16" x 12" | 9" | 18" | 125–139 |
| 20.1" | 16.08" x 12.06" | 9.05" | 24" | 136–150 |

It is seen from Table 1 that the distance from the eye line (eye level) to the bottom of each panel is ¾th of the height (H) of the panel to provide the user comfort. The distance between the eye point of the user and the center panel preferably is between approximately 18" and approximately 24". The angle between the center panel and each of the side panels preferably is selected from a range of angles. For example, for a multi-panel video display with 12.1" display panels at the distance of 18" from the user's eye point, the range of angles is 138 degrees to 162 degrees. The range of angles is allowed under ergonomic principles since, e.g., the side panels may be further or closer to the user's eye point than the center panel by up to approximately one inch. It is also seen from Table 1 that the angle between the center panel and the side panel is typically inversely proportional to the size of the panel.

Accordingly, the present invention provides a multi-panel video display for displaying a high-resolution composite image. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents rather than the foregoing description.

We claim:

1. A multi-panel video display system comprising:
    a plurality of display panels to display a composite image, each display panel including a display area; and
    a single housing to contain the plurality of display panels comprising at least three display panels, thereby allowing the display panels to be placed closer to one another as compared to installing each display panel in its own housing,
    wherein the plurality of display panels are fixedly mounted in said single housing, are mounted adjacent to one another so as to limit a width of a mullion between adjacent display areas to approximately 3% or less of a total combined width of the display areas, so as to reduce a distracting effect of the mullion on a user, and the adjacent display panels are at a fixed angle, which is greater than or equal to 110 degrees and less than 180 degrees with respect to one another, so as to be substantially equidistant from an eye point of the user.

2. The multi-panel video display system of claim 1 wherein the width of the mullion between adjacent display areas is between approximately 1% to approximately 3% of the total combined width of the display areas.

3. The multi-panel video display system of claim 1 wherein the width of the mullion between adjacent display areas is less than approximately 1% of the total combined width of the display areas.

4. The multi-panel video display system of claim 1 wherein the plurality of display panels includes three display panels consisting of a left display panel, a center display panel and a right display panel.

5. The multi-panel video display system of claim 4 wherein said single housing is tilted forward so that an angle between a display surface of the center display panel and a plane normal to ground is between approximately 2 degrees and approximately 5.5 degrees.

6. The multi-panel video display system of claim 4 wherein the center panel is mounted in such a way that an eye level of the user is at ¾th of the way from a bottom of the center panel to a top of the center panel.

7. The multi-panel video display system of claim 1 wherein each of the plurality of display panels is selected from a group consisting of an LCD panel, a plasma display panel and a digital display panel.

8. The multi-panel video display system of claim 1 further comprising;
    a support having a upper end and a lower end, said single housing being mounted on the upper end of the support; and
    a base which is coupled to the lower end of the support.

9. The multi-panel video display system of claim 8 wherein the upper end of the support is fixedly coupled to the housing, and the lower end of the support is fixedly coupled to the base.

10. The multi-panel video display system of claim 8 wherein the upper end of the support is hingedly coupled to said single housing, so that said single housing can be tiltably adjusted with respect to the support.

11. The multi-panel video display system of claim 8 wherein the support includes a hinge member, and wherein the support can be adjusted about the hinge member.

12. The multi-panel video display system of claim 8 wherein the support is rotatably coupled to the base so that the support can be rotated about an axis normal to ground.

13. The multi-panel video display system of claim 1 further comprising a communication/control port for the display panels to communicate with an external device.

14. The multi-panel video display system of claim 13 wherein the communication/control port comprises a USB control port.

15. The multi-panel video display system of claim 13 wherein the communication/control port comprises an RS-232 control port.

16. The multi-panel video display system of claim 1 further comprising a video input selected from a group consisting of a composite video input, an RGB video input and an S-video (Y/C) input.

17. The multi-panel video display system of claim 16 wherein the video input selection for the display panels can be made by pressing a single button.

18. The multi-panel video display system of claim 1 further comprising a control unit for providing power to the display panels.

19. The multi-panel video display system of claim 1 further comprising a control unit for controlling display characteristics of the display panels.

20. A method of displaying a high resolution image using a plurality of display panels comprising:
    fixedly mounting the plurality of display panels comprising at least three display panels at an angle, which is greater than or equal to 110 degrees and less than 180 degrees with respect to one another, in a single housing closely to one another so as to limit a width of a mullion between viewable areas of adjacent ones of the plurality of display panels to approximately 3% or less of a total combined width of the viewable areas, thereby reducing a distracting effect of the mullion on a user,
    wherein the angles between the display panels are selected such that the display panels are substantially equidistant from an eye point of the user.

21. The method of displaying a high resolution image using a plurality of display panels of claim 20 further comprising:
    providing a portion of a composite image to each of the plurality of display panels so as to display a single high resolution composite image across the plurality of display panels.

22. The method of displaying a high resolution image using a plurality of display panels of claim 20 further comprising;
    providing an independent image to at least one of the plurality of display panels so as to display more than one independent images on the plurality of display panels.

23. The method of displaying a high resolution image using a plurality of display panels of claim 20 wherein a single multi-channel visual computer provides an image to each of the plurality of display panels.

24. The method of displaying a high resolution image using a plurality of display panels of claim 20 wherein at least two separate image sources provide images to the plurality of display panels.

25. The method of displaying a high resolution image using a plurality of display panels of claim 20 wherein mounting a plurality of display panels includes mounting a center panel so that an eye level of the user is at ¾ of the way between a bottom of the center panel and a top of the center panel.

26. A method of fabricating a three-panel video display system, each panel comprising a viewable area, for displaying a high resolution image comprising:

calculating a range of angles, greater than or equal to 110 degrees and less than 180 degrees, between a center panel and each of left and right side panels, the range of angles being selected such that the center panel, the left side panel, and the right side panel are substantially equidistant from an eye point of a user when the distance between the center panel and the eye point of the user is between a first predetermined distance and a second predetermined distance; and fixedly mounting the center panel and the left and right side panels in a single housing with a fixed angle between the center panel and each of the left and right side panels within the range of angles, said display panels being mounted closely to one another so as to limit a width of a mullion between adjacent viewable areas to approximately 3% or less of a total combined width of the viewable areas.

27. The method of fabricating a three-panel video display system of claim 26 wherein mounting the center panel and the left and right side panels includes limiting the width of the mullion between the viewable area of the center panel and the viewable area of each of the left and right side panels to between approximately 1% and approximately 3%, thereby reducing a distracting effect of the mullion on the user.

28. The method of fabricating a three-panel video display system of claim 27 wherein the support includes a hinge member to adjust the height of the support.

29. The method, of fabricating a three-panel video display system of claim 26, further comprising mounting said single housing on a support, wherein a height of the support is selected so that an eye level of the user is at ¾th of the way from a bottom of the center panel to a top of the center panel.

30. The method of fabricating a three-panel video display system of claim 26 wherein the first predetermined distance is approximately 18 inches and the second predetermined distance is approximately 24 inches.

31. The method of fabricating a three-panel video display system of claim 26 wherein said single housing is tilted forward so that an angle between a display surface of the center display panel and a plane normal to ground is between approximately 2 degrees and approximately 5.5 degrees.

* * * * *